Oct. 2, 1934.    J. T. WISEMAN    1,975,244

JOINT FOR ELECTRICAL CONDUCTORS

Filed July 8, 1932

INVENTOR
John T. Wiseman
BY
S. J. Cox,
ATTORNEY

Patented Oct. 2, 1934

1,975,244

UNITED STATES PATENT OFFICE 1,975,244

JOINT FOR ELECTRICAL CONDUCTORS

John T. Wiseman, Brooklyn, N. Y., assignor to United Dry Docks, Incorporated, New York, N. Y., a corporation of New York Application July 8, 1932, Serial No. 621,385

6 Claims. (Cl. 173—363)

The present improvements relate to joints for electrical conductors, and are more particularly designed to provide a reliable union for cables and the like, having a multiplicity of wires, although they are not limited to such applications.

A primary object of the improvements, among others, is to provide a novel joint for electrical conductors which will maintain the sections of the conductor in an intimate contact, mechanically as well as conductively.

A further object is to provide an improved joint for flexible conductors which may be manually connected and disconnected without the use of tools. The provision of rigid members with temporary and permanent locking features constitutes a further object.

Another object is to provide interlocking members which may be conveniently and speedily manipulated. It is also desirable to provide releasable locking members in the unit which will hold and/or wedge the parts in intimate contact.

A further object is to provide a sturdy and reliable joint which will prevent arcing, will withstand strains and will be dependable under rough usage.

Other objects and advantages will be apparent to those skilled in the art, upon reference to the accompanying description and drawing, in which Fig. 1 is a perspective view of one form of the present improvements;

Figure 3:
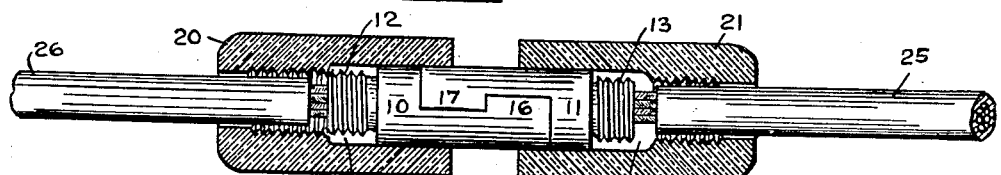
Fig. 3 is a part sectional and part elevational view, showing the temporary locking feature.
Figure 4:
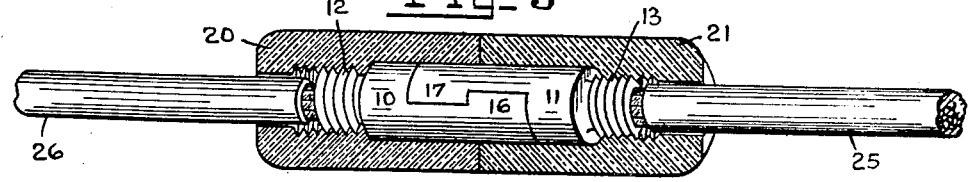
Figure 5:
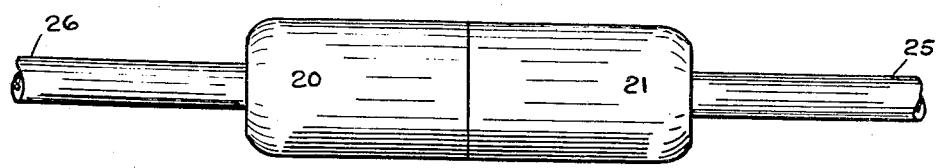
Figure 6:
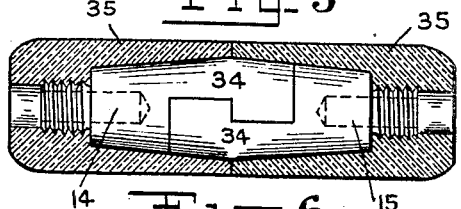
Figure 7:
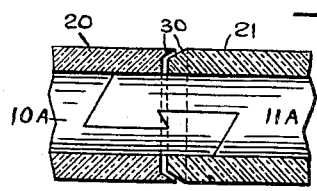

Fig. 4 is a view similar to that in Fig. 3, with the parts locked in final position;

Fig. 5 is an elevational view of the completed joint, with the parts in the position of Fig. 4;

Figs. 6 and 7 illustrate modified forms.

One embodiment of the invention has been illustrated, by way of example, in Figs. 1 to 5. Referring to these views, the metallic terminal members 10, 11 may be machined or cast, preferably the latter, into the rigid form disclosed.
As a matter of economy in manufacture, these members may be identical, so that they may be cast in a single mold. Furthermore, the duplication of these parts is a great convenience in assembling the joint, eliminating the necessity of workmen selecting complementary members.

Figure 2:
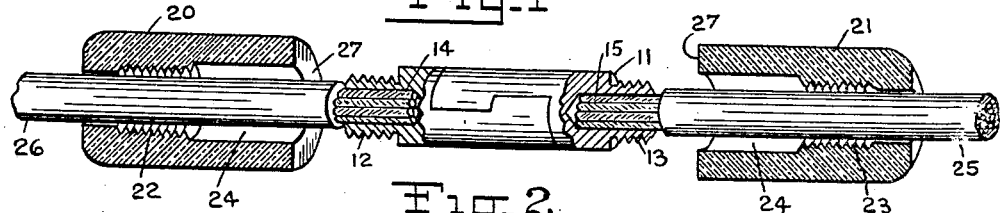
Fig. 2 is a view similar to Fig. 1, having parts in section, showing the jaw members engaged.

These members 10, 11 have screw threaded portions 12, 13 adjacent their ends, and are provided with a bore or recess at 14, 15 as illustrated in Fig. 2, for receiving line wires. Any other suitable means may be provided for attaching line wires to the terminals. The opposite ends of the terminal members are formed as jaw members 16, 17, which are formed by a recess extending longitudinally of the side face of the terminals. This recessed face in each terminal is counter recessed to provide the tongue and groove relation defined by recess 18 and projection 19.

Since parts 10 and 11 are duplicates their complementary jaw members may be overlapped and fit together in engagement and close contact, so that no clearance between the parts is apparent, and the circumference of the joined members is uniform.

A protective covering for the metallic terminals is provided in the form of an insulating enclosure. While this protection may be designed as a one piece sleeve covering both terminals, it is preferably embodied in two sleeve members 20, 21, which may be of identical construction.

As illustrated, each sleeve member is internally screw threaded, as at 22, 23, being also provided with a smooth bore 24, which is of a diameter to accommodate the terminals 10, 11 with a nice, close fit. The sleeve members may be formed of any suitable insulating material such as fibre or the like, so long as the material lends itself to production in the form illustrated, and is non-yielding and rigid.

When in use the cable or other conductors 25, 26 are first threaded through sleeve members 20, 21, and their ends are then fixed or anchored to the rigid metallic members 10, 11. This may be accomplished by brazing or otherwise securing the cable in the recesses 14, 15 as illustrated. When this operation has been effected, the union of the two cables 25 and 26 may be accomplished by practicing the steps illustrated in Figs. 1 to 5.

Figure 1:
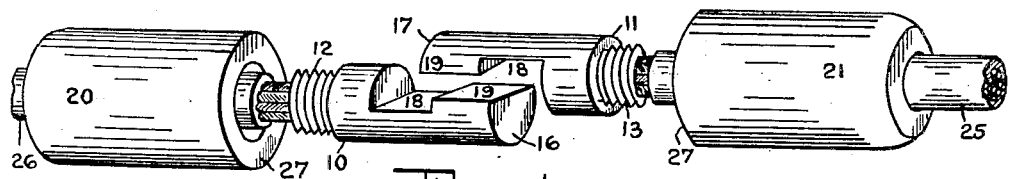

The terminals 10 and 11 may be brought into overlapping relation, as seen in Fig. 1, and the jaw members, with the male and female parts 18 and 19, may be moved into engagement, as in Fig. 2. In this condition, the terminals are locked against longitudinal movement and may sustain a great load exerted in the direction of the cable, although transversely the parts may be separated.

Means for temporarily locking the parts in alignment, is provided until the hands of the operator, assembling the joint, are free to screw the parts into place. This advantageous feature is derived by providing the sleeve members 20, 21 with a bore 24 of sufficient extent so that the threads 23, 13 and 22, 12, do not encounter each other until the inner edges 27 of the sleeves are well over the overlapping portions of the terminals 10, 11. By having a portion of the sleeve disposed about the overlapped jaw members, the latter are temporarily locked together and cannot be separated longitudinally or transversely. This effect is clearly seen, by the relation of the parts in Fig. 3.

It is necessary to move only one sleeve member, such as 21, longitudinally of the cable, i. e., from the position in Fig. 2 to that in Fig. 3, in order to attain the locking result. After this has been accomplished, the sleeve members 20, 21 may be screwed over the members 10, 11, until the former meet and completely enclose the terminals, as seen in Figs. 4 and 5. The screw threads cooperating between the rigid metallic terminals and the rigid sleeve members provide an excellent means for holding and permanently locking the terminals in contact and the sleeves in final position. It is understood that this locking is permanent in contrast to the temporary expedient described above, but otherwise is releasable for readily disconnecting the parts, as is apparent.

It will be seen that the various parts may take forms other than those illustrated. The members 10 and 11 may have their faces variously cut or contoured so as to provide the overlapping relation. Any other tongue and groove connection, such as a bayonet joint may be employed, or the faces may be tapered, but some such arrangement is preferable so as to maintain the diameter of the unit substantially uniform. Upon reference to Fig. 7, a dove-tail relation of parts is illustrated. In this form, the members 10A and 11A may be joined by sliding the parts laterally. The beveled faces 30 on the sleeve members 20, 21, in Fig. 7, constitute a modified form, which permits the insulating parts to overlap, and more effectively exclude moisture, etc.

It is noteworthy that cooperating threads 12, 13, 22 and 23, serve as a releasable locking means which may take various forms without departing from the purview of the claims.

Upon reference to Fig. 6, a modified form is disclosed, wherein the outer periphery of the terminals 34 is tapered, so as to produce a conical surface and the bores of the sleeve members 35 are correspondingly shaped. The bores of the sleeve members are tapered a slight degree from that of the aforementioned conical surface, so that a wedging action is produced when the outer members are screwed home. This effects a tight contact of the two terminals and a secure positioning of the sleeves.

The present improvements are particularly advantageous in insuring an effective contact between cables or other electrical conductors, and in insuring against arcing, short circuits, and attendant fires and other disasters.

Furthermore, the joint is so sturdy and effective, as to withstand any amount of knocking about or strain, to which it might be subjected in being dragged over uneven or rough objects or surfaces. The joint will not separate or yield when the cable is pulled or jerked, and any number of such joints may be employed without any danger of them parting or causing arcing. The structure is so designed that the insulating covering cannot come loose or be inadvertently or unintentionally pushed back or separated.

By the development of the present improvements, electrical conductors may be readily and conveniently connected and disconnected. Additional lengths of cable may be inserted at will or similarly removed. It is of marked advantage in construction and repair work, wherein electrical tools are employed, to be able, as the work progresses, and proceeds farther from the source of electrical energy, to insert a length of cable with such ease and without any tools whatsoever. Furthermore, when the joint is finished, the present improvements give the assurance that the insulation will not become impaired and permit arcing.

I claim:

1. A joint for electrical conductors comprising two metallic terminals, said terminals having complementary interlocking surfaces for mutual engagement, an electrical conductor fixed to each terminal at remote ends thereof; and an insulating sleeve directly engaging said terminals for holding same in mutual engagement, and a threaded connection between said sleeve and one of said terminals for holding said sleeve in position.

2. A joint for electrical conductors comprising two metallic terminals, said terminals having complementary interengaging portions, a rigid insulating sleeve surrounding and engaging said terminals, and a threaded connection between said sleeve and one of said terminals for removably securing said sleeve in position.

3. A cable connection for uniting electrical conductors comprising a pair of rigid metallic terminals having complementary overlapping jaw portions, a recess in each terminal for receiving the conducting wires of an electrical cable, an externally screw threaded portion on each terminal, a pair of insulating sleeve members, one of said members snugly engaging both said terminals for holding same in contacting relation, said members being internally screw threaded for cooperating with the threaded portion of said terminals for holding the sleeve members in position about the terminals.

4. A joint for electrical conductors comprising rigid metallic members having externally screw threaded ends, said members being longitudinally recessed for disposition in overlapping position, insulating sleeve members each having a screw threaded interior portion spaced from the end of the sleeve, the threads being spaced from the ends of said sleeves a sufficient distance to afford longitudinal sliding movement of said sleeves over portions of the overlapped metallic members for temporarily holding same in alignment, before the complementary threads are brought into engagement.

5. A joint for electrical conductors comprising overlapping terminals, screw threaded means on opposite ends of each terminal, insulating sleeve members having their inner walls flush with said terminals and having internally screw threaded means engageable with said first named means, said sleeve members being rotatable toward each other by said screw threaded means until they meet over said terminals.

6. A joint for electrical conductors comprising overlapping terminal members, screw threaded means on one of said terminal members, an insulating sleeve member having its inner wall flush with said terminal members and having internally screw threaded means engageable with said first named means, said sleeve member extending over a portion of both overlapping terminal members.

JOHN T. WISEMAN.